US009976561B2

(12) United States Patent
Huscher et al.

(10) Patent No.: US 9,976,561 B2
(45) Date of Patent: May 22, 2018

(54) METHOD FOR SECURING STATOR IN HIGH SPEED ELECTRIC MOTORS

(71) Applicant: BorgWarner Inc., Auburn Hills, MI (US)

(72) Inventors: Frederick M. Huscher, Hendersonville, NC (US); Austin Hoke, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 229 days.

(21) Appl. No.: 15/095,852

(22) Filed: Apr. 11, 2016

(65) Prior Publication Data

US 2017/0292524 A1    Oct. 12, 2017

(51) Int. Cl.

| | |
|---|---|
| H02K 5/00 | (2006.01) |
| F04D 25/06 | (2006.01) |
| F01D 5/02 | (2006.01) |
| F01D 15/00 | (2006.01) |
| F01D 25/16 | (2006.01) |
| F01D 25/24 | (2006.01) |
| F04D 29/056 | (2006.01) |
| F04D 29/28 | (2006.01) |
| F04D 29/42 | (2006.01) |
| H02K 1/18 | (2006.01) |
| F01D 15/10 | (2006.01) |
| F02B 39/10 | (2006.01) |

(52) U.S. Cl.
CPC ............. *F04D 25/06* (2013.01); *F01D 5/02* (2013.01); *F01D 15/00* (2013.01); *F01D 15/10* (2013.01); *F01D 25/16* (2013.01); *F01D 25/162* (2013.01); *F01D 25/24* (2013.01); *F02B 39/10* (2013.01); *F04D 29/056* (2013.01); *F04D 29/284* (2013.01); *F04D 29/4206* (2013.01); *H02K 1/185* (2013.01); *F05D 2220/40* (2013.01)

(58) Field of Classification Search
CPC ............. H02K 5/04; H02K 15/14; H02K 5/00
USPC ..................................................... 310/87–91
See application file for complete search history.

(56) References Cited

U.S. PATENT DOCUMENTS

| | | | |
|---|---|---|---|
| 3,512,020 A | 5/1970 | Konet | |
| 5,158,304 A | 10/1992 | Orlowski | |
| 5,639,228 A | 6/1997 | Van De Venne et al. | |
| 6,478,553 B1 * | 11/2002 | Panos | F01D 25/16 310/90 |
| 6,619,911 B1 | 9/2003 | Englander et al. | |

(Continued)

*Primary Examiner* — Thanh Lam
(74) *Attorney, Agent, or Firm* — Warn Partners, P.C.

(57) ABSTRACT

An electromechanical is provided which includes an electromagnetic rotor, a housing with an interior opening with a stop, a first bearing mount for supporting a first bearing rotatably mounting the rotor in the housing, a cover connected with the housing having a boss having an interior providing a second bearing mount supporting a second bearing rotatably mounting the rotor in the housing, a stator having a clearance fit within the housing interior opening, the stator being axially limited in a direction toward such first bearing mount by the housing stop, the stator having an axial clearance in a direction toward the cover boss, and an elastomeric spacer connected on an extreme end of the boss compliantly filling the axial clearance between the stator and the boss positioning the stator in an axial direction and restricting movement of the stator in an angular direction within the housing opening.

16 Claims, 4 Drawing Sheets

(56) References Cited

U.S. PATENT DOCUMENTS

| | | | |
|---|---|---|---|
| 7,015,605 B1 | 3/2006 | Peter et al. | |
| 7,550,881 B1 | 6/2009 | Dietrich et al. | |
| 7,847,452 B2 | 12/2010 | Brown | |
| 2002/0135248 A1* | 9/2002 | Coyac | F16C 27/066 310/90 |
| 2006/0175565 A1 | 8/2006 | Nungesser et al. | |
| 2007/0210661 A1* | 9/2007 | Schmidt | H02K 5/06 310/90 |
| 2008/0157614 A1* | 7/2008 | Huang | H02K 5/04 310/89 |
| 2013/0162112 A1* | 6/2013 | Loefel | B62M 6/55 310/68 B |
| 2014/0001901 A1* | 1/2014 | Finney | H02K 5/128 310/88 |
| 2014/0090626 A1* | 4/2014 | An | H02K 5/1732 123/565 |
| 2014/0205222 A1 | 7/2014 | Biggs et al. | |

* cited by examiner

METHOD FOR SECURING STATOR IN HIGH SPEED ELECTRIC MOTORS

FIELD OF THE INVENTION

The present invention relates to electric motors. More particularly the present invention relates to electric motors utilized in electric turbochargers.

BACKGROUND OF THE INVENTION

To enhance the thermal efficiency of internal combustion engines, it is often desirable to increase the pressure of the engine's intake charge. Prior solutions utilized a compressor which was either mechanically driven by the engine's cranktrain (supercharging) or thermally and kinetically driven by the engine's exhaust stream (turbocharging). A major limitation of both approaches is since they rely on engine power, intake boosting is not available at times of low engine power. One remedy to this problem is to either use a standalone electrically-driven compressor or electrically assist the existing compressor integral with the turbocharger. Due to the required thermodynamic behavior of the compressor, high rotational speeds for the electrical machine are required. The electrical machine is subject to similarly high speeds, dictating a high speed, low torque electrical motor/generator for this application.

Most electrically-assisted compressors utilize a compressor wheel powered by an electric motor. The electric motor typically has an electromagnetic rotor surrounded by an electric stator. To prevent the stator from rotating inside the housing, the stator is typically retained using an adhesive, mechanical fastener, or interference fit between the stator and stator housing. It is desirable to provide an electric motor suitable for use in an electrically-assisted turbocharger or supercharger wherein a stator of the motor can have a clearance fit within the motor housing allowing for lower assembly costs due to the easier insertion of the stator in the motor housing, elimination of interference fits, adhesives, fasteners or additional parts to keep the stator from rotating in the motor housing while at the same time having a fit close enough to promote conductive heat transfer between the stator and the motor housing.

SUMMARY OF THE INVENTION

To make manifest the above noted desires, a revelation of the present invention is brought forth. In a preferred embodiment, the preset invention provides a freedom of an electromechanical machine which includes an electromagnetic rotor, a housing with an interior opening with a stop, a first bearing mount for supporting a first bearing rotatably mounting the rotor in the housing, a cover connected with the housing having a boss having an interior providing a second bearing mount supporting a second bearing rotatably mounting the rotor in the housing, a stator having a clearance fit within the housing interior opening, the stator being axially limited in a direction toward such first bearing mount by the housing stop, the stator having an axial clearance in a direction toward the cover boss, and an elastomeric spacer connected on an extreme end of the boss compliantly filling the axial clearance between the stator and the boss positioning the stator in an axial direction and restricting movement of the stator in an angular direction within the housing opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
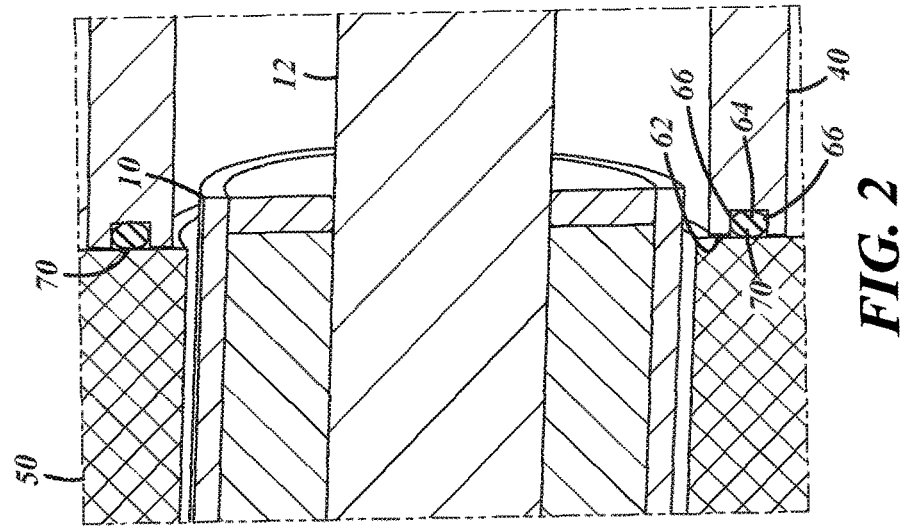
FIG. 2 is an enlargement of a portion of FIG. 1.
Figure 1:
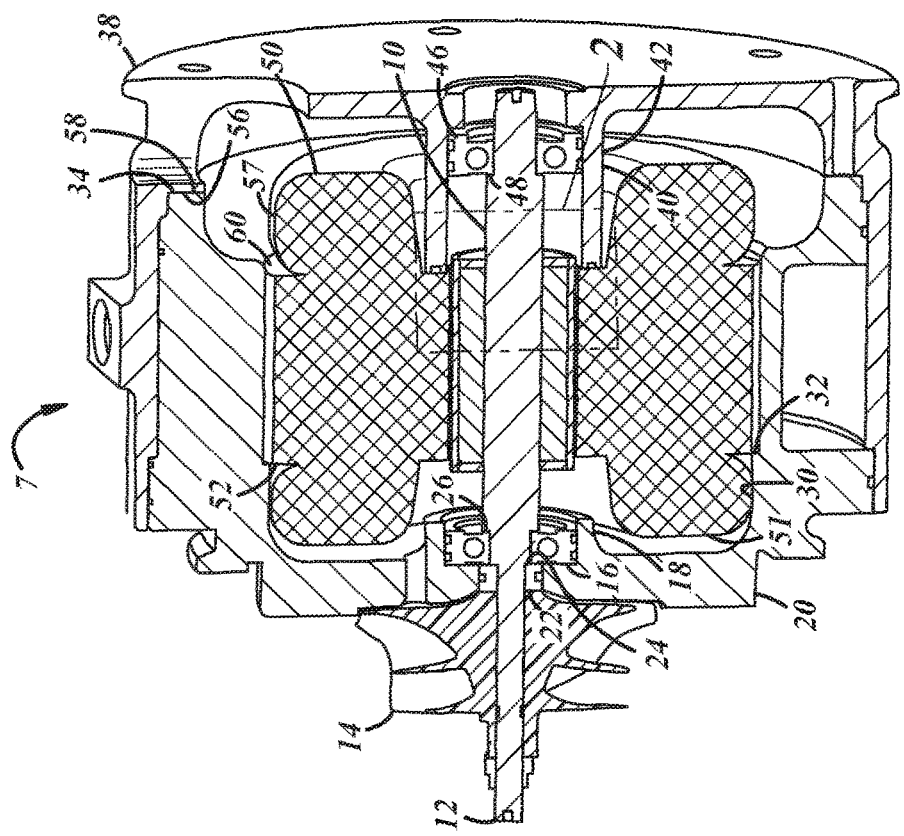
FIG. 1 is a sectional perspective view of a preferred embodiment electromechanical machine of the present invention utilized as a compressor.
Figure 3:
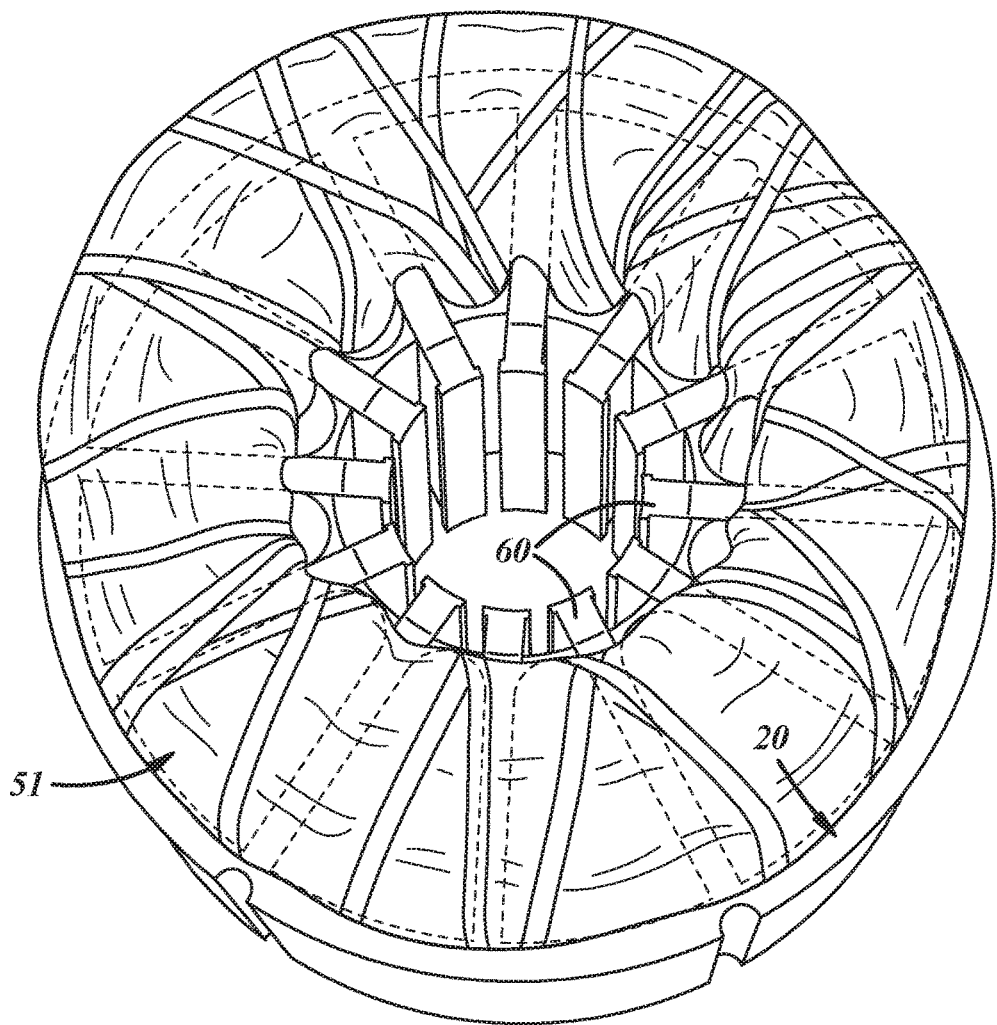
FIG. 3 is a perspective end view of the electromechanical machine of FIG. 1 with a cover removed.

Referring to FIGS. 1 through 3, an electrically-assisted turbocharger 7 and electric motor of the present invention is provided. The turbocharger 7 has an electromagnetic rotor assembly 10 that includes a rotor shaft 12. The rotor shaft 12 has connected at one end a turbocharger compressor wheel 14. The rotor shaft 12 is rotatably mounted on a first end by a first bearing 16. The first bearing 16 can be a roller bearing, fluid film bearing, magnetic bearing or air foil bearing. The first bearing 16 is positioned and supported in a first bearing mount 18. The first bearing mount 18 is fixed with respect to and integrally formed with a housing 20. The housing is typically fabricated from aluminum, stainless steel, cast iron, or polymer. In front of the first bearing 16 is a seal 22. The rotor shaft 12 has a shoulder 24 that abuts the seal 22. The rotor shaft 12 also has outer radial shoulder 26 that abuts the first bearing 16. The housing 20 has an interior opening 30. The interior opening has an axial stop provided by a shoulder 32.

A cover 38 is provided. The cover is typically fabricated from aluminum, stainless steel, cast iron, or polymer. The cover 38 has and extreme surface 34 generally opposite the side of the housing which has the first bearing mount 18. The cover has a fixedly connected boss 40. The boss 40 is tubular and provides a second bearing mount 42 for a second bearing 46 which rotatably mounts the stator shaft 12 adjacent an end generally opposite the compressor wheel 14. The second bearing 46 can be multiple types of bearing like the first bearing 16. The bearing 46 abuts a shoulder 48 of rotor shaft 12.

An electrical stator 50 is provided. The stator as shown in FIGS. 1 and 2 is shown schematically however the stator has a ferromagnetic body or core fabricated from a series of laminations. The laminations are wrapped with coil windings 51. The stator has a slip fit within the housing opening 30. As used herein the term slip fit refers to a clearance that is tight but is loose enough to allow for easy manual insertion or rotation of the stator after insertion in the housing opening. In certain applications, the stator outer diameter may also be covered in thermal grease which aids heat conduction between the stator and housing. A lamination 52 along a forward end of the stator contacts the housing opening shoulder 32 to limit its axial position in a direction towards the compressor wheel 14.

The cover 38 has a shoulder 56. The shoulder 56 contacts with the surface 58 of the housing ensuring that there is a slight clearance between a lamination 60 of the stator with an extreme axial end face 62 of the tubular boss 40 when the forward end of the stator abuts housing shoulder 32. The axial end face 62 of the tubular boss has geometry to accept an elastomeric spacer. The geometry may be a groove as shown or any other pattern to accept/align an elastomeric spacer, such as but not limited to a ridge or other configuration. The elastomeric spacer may be shaped like an O-ring as shown but may be other annular members with other cross sectional shapes such as rectangular, polygonal, and curvilinear shapes. In contact with the geometry 64 is an elastomeric spacer. The elastomeric spacer 70 compliantly fills the axial clearance between the stator and the boss 40 positioning the stator 50 in an axial direction and restricting movement of the stator in an angular direction within the housing due to static friction in the stator/elastomeric spacer/cap (boss) interface.

An additional advantage of the invention is that the axial compression of the elastomeric spacer allows for a relatively large axial machining clearance and tolerance between the stator and cap. Since the elastomer interface, supra, is compressed, the compression exerts an axial force between the stator and stator housing shoulder, positively constraining the stator in the axial direction with no additional fixation.

Figures 4, 5:
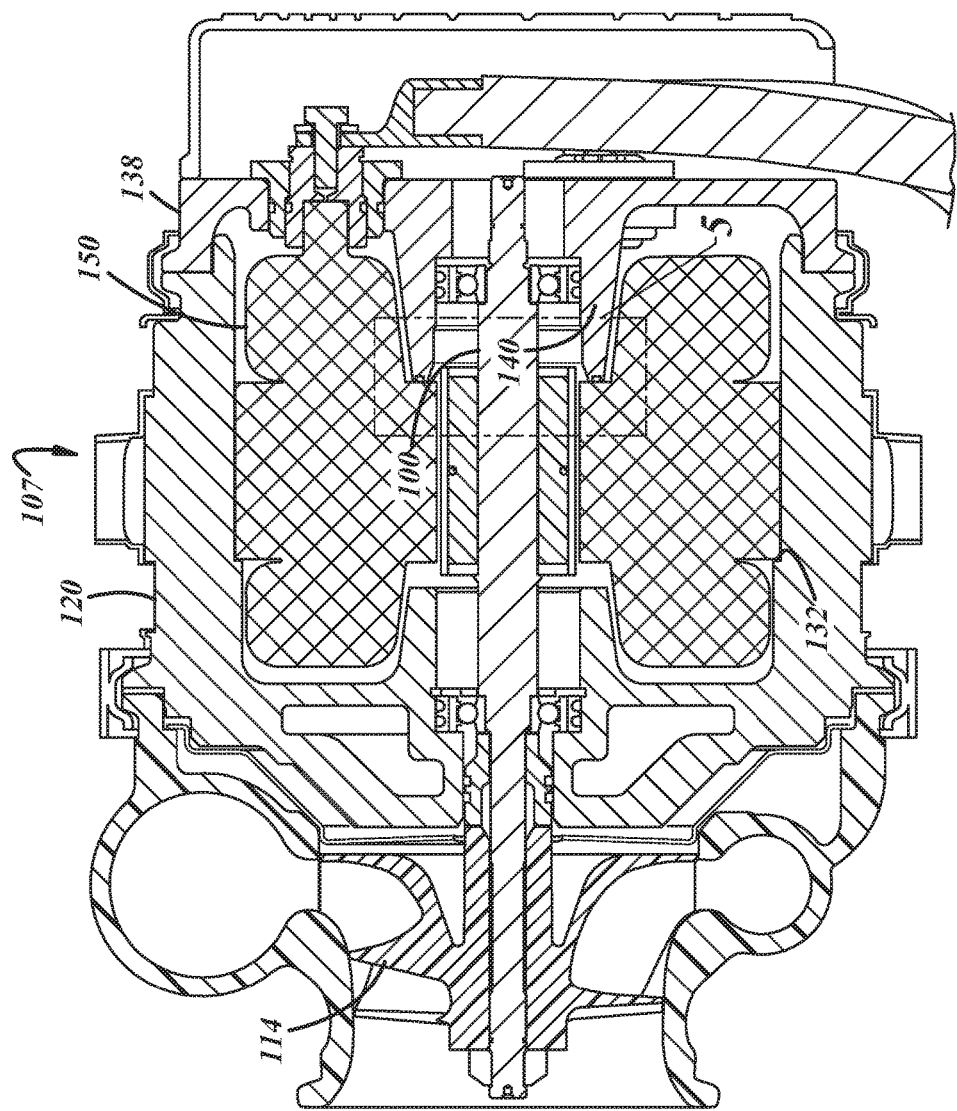
FIG. 4 is a sectional perspective view of a preferred embodiment electromechanical machine of the present invention utilized as a turbine.
FIG. 5 is an enlargement of a portion of FIG. 4.

FIGS. 4 and 5 illustrate an embodiment of the present invention of an electromechanical machine of the current invention of a turbine generator 107. A rotor 100 mounted in housing 120 and cover 138 has connected thereto a turbine wheel 114. The engines exhaust powers the turbine. An O-ring shaped elastomeric spacer 170 is provided in an axial face 162 of a boss 140. The elastomeric spacer 170 restrains angular motion of the stator 150. Stator 150 is also axially restrained by housing opening stop 132.

Figure 6:
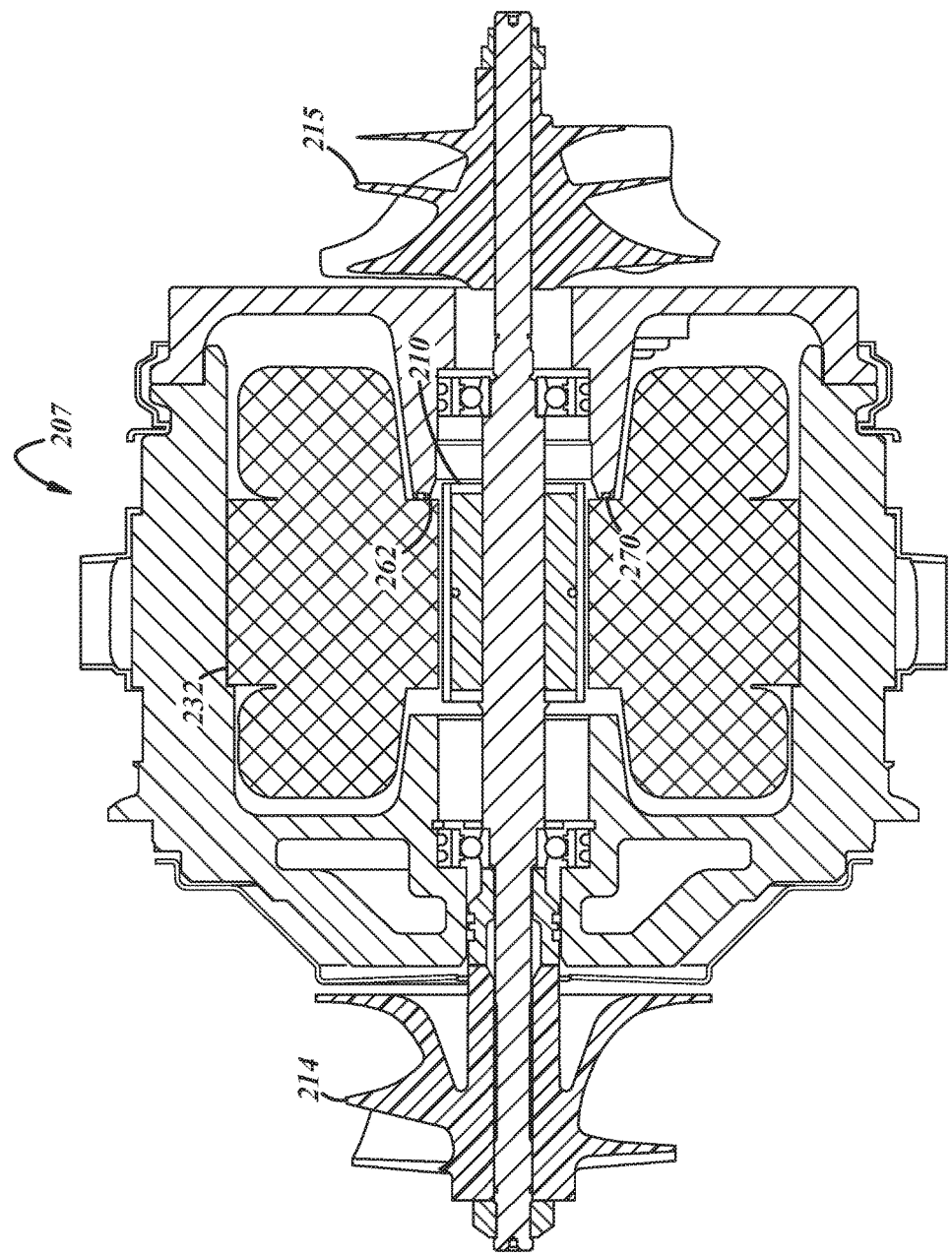
FIG. 6 is a sectional perspective view of a preferred embodiment electromechanical machine of the present invention utilized as a turbocharger.

FIG. 6 illustrates an embodiment of the present invention of an electromechanical machine of the current invention of a turbocharger 207. A rotor 220 mounted in housing 220 and cover 238 has connected thereto a turbine wheel 214 and compressor wheel 215. An O-ring shaped elastomeric spacer 270 is provided in an axial face 262 of a boss 240 is also provided to restrain angular motion of the stator 250. Stator 250 is also axially restrained by housing opening stop 232.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromechanical machine comprising:
    an electromagnetic rotor;
    a housing with an interior opening with a stop;
    a first bearing mount fixed with respect to said housing for supporting a first bearing rotatably mounting said rotor in said housing;
    a cover fixedly connected with said housing, said cover having a fixedly connected boss having an interior providing a second bearing mount supporting a second bearing rotatably mounting said rotor in said housing;
    a stator having a clearance fit within said housing interior opening, said stator being axially limited in a direction toward such first bearing mount by said housing stop, said stator having an axial clearance in a direction toward said cover boss; and
    an elastomeric spacer connected on an extreme end of said boss compliantly filling said axial clearance between said stator and said boss positioning said stator in an axial direction and restricting movement of said stator in an angular direction within said housing opening.

2. The electromechanical machine of claim 1 wherein said boss extreme end has an axial face of the elastomeric spacer geometry placed therein for placement of said elastomeric spacer.

3. The electromechanical machine of claim 1 wherein said stop is a shoulder in said housing interior opening.

4. The electromechanical machine of claim 1 wherein said geometry has two sidewalls.

5. The electromechanical machine of claim 1 wherein said stator has laminations and wherein one of said laminations contacts said stop in said housing.

6. The electromechanical machine of claim 1 wherein said stator has laminations and wherein one of laminations contacts said elastomeric spacer.

7. The electromechanical machine of claim 1 wherein said first bearing is taken from a group including roller bearings, fluid film bearings, magnetic bearings, or air foil bearings.

8. The electromechanical machine of claim 1 wherein said second bearing is taken from group including roller bearings, fluid film bearings, magnetic bearings or air foil bearings.

9. The electromechanical machine of claim 1 wherein said rotor is connected with a component taken from a group including turbine wheels and compressor wheels.

10. The electromechanical machine of claim 1 wherein said rotor is connected with a turbine wheel and a compressor wheel.

11. An electromechanical machine of claim 1 wherein said rotor is connected with a turbine wheel and said stator is part of a generator.

12. The electromechanical machine of claim 1 wherein said electric motor can reach speeds up to 200,000 RPM.

13. The electromechanical machine of claim 1 wherein said cover has a shoulder to limit an axial position of said cover with respect to said housing.

14. An electromechanical machine turbocharger comprising:
    an electric rotor connected with at least one of a group of wheels including turbine wheels and compressor wheels;
    a housing with an interior opening with a shoulder stop;
    a first bearing mount fixed with respect to said housing for supporting a bearing rotatably mounting said rotor in said housing;
    a cover fixedly connected with said housing, said cover having a fixedly connected boss having an interior providing a second bearing mount supporting a second bearing rotatably mounting said rotor in said housing, said cover having a shoulder stop for setting an axial limit of said cover with respect to said housing;
    an electric stator having laminations wrapped with coil windings, said stator having a clearance fit within said housing, said stator being axially limited in a direction toward such first bearing mount by said housing shoulder stop contacting said laminations, said stator having an axial clearance in a direction toward said cover boss; and an elastomeric spacer connected in an geometry in an extreme axial end face of said boss compliantly filing said axial clearance between said stator and said boss positioning said stator in an axial direction and restricting movement of said stator in an angular direction within said housing.

15. An electromechanical machine turbocharger comprising:
   an electric rotor connected with a turbine wheel and a compressor wheel;
   a housing with an interior opening with a shoulder stop;
   a first bearing mount fixed with respect to said housing for supporting a bearing rotatably mounting said rotor in said housing;
   a cover fixedly connected with said housing, said cover having a fixedly connected boss having an interior providing a second bearing mount supporting a second bearing rotatably mounting said rotor in said housing, said cover having a shoulder stop for setting an axial limit of said cover with respect to said housing;
   an electric stator having laminations wrapped with coil windings, said stator having a clearance fit within said housing, said stator being axially limited in a direction toward such first bearing mount by said housing shoulder stop contacting said laminations, said stator having an axial clearance in a direction toward said cover boss; and
   an elastomeric spacer connected in an geometry in an extreme axial end face of said boss compliantly filing said axial clearance between said stator and said boss positioning said stator in an axial direction and restricting movement of said stator in an angular direction within said housing.

16. A turbocharger as described in claim 14 wherein said geometry is a groove.

\* \* \* \* \*